United States Patent [19]

Han

[11] Patent Number: 4,696,222

[45] Date of Patent: * Sep. 29, 1987

[54] BRAKE HOLDING SYSTEM

[76] Inventor: Joon H. Han, 816 Gregorio Dr., Silver Spring, Md. 20901

[*] Notice: The portion of the term of this patent subsequent to Mar. 3, 2004 has been disclaimed.

[21] Appl. No.: 804,786

[22] Filed: Dec. 5, 1985

Related U.S. Application Data

[63] Continuation-in-part of Ser. No. 763,715, Aug. 8, 1985, Pat. No. 4,646,903.

[51] Int. Cl.$^4$ .............................................. B60K 41/24
[52] U.S. Cl. .................................. 192/3 H; 188/265; 192/3 TR
[58] Field of Search ........................... 192/3 H, 3 TR; 188/181 R, 265

[56] References Cited

U.S. PATENT DOCUMENTS

| | | | |
|---|---|---|---|
| 1,927,209 | 9/1933 | Gilmore | 192/3 TR X |
| 2,235,412 | 3/1941 | Weiss et al. | 192/3 TR |
| 2,308,822 | 1/1943 | Murphy | 188/181 R X |
| 2,313,232 | 3/1943 | Freeman | 192/3 H |
| 2,642,484 | 6/1953 | Price | 220/20 |
| 2,690,824 | 10/1954 | Forman | 192/3 H |
| 2,843,235 | 7/1958 | Weaver | 192/3 TR |
| 2,849,557 | 8/1958 | Long | 200/619 |
| 2,904,134 | 9/1959 | Cieply, Jr. | 192/3 TR X |
| 2,938,611 | 5/1960 | Cooke | 192/3 H |
| 2,973,844 | 3/1961 | Prather | 188/181 R X |
| 3,021,821 | 2/1962 | Prather | 91/373 |
| 3,315,536 | 4/1967 | Claeys | 192/3 TR X |
| 4,446,950 | 5/1984 | Wise et al. | 192/3 TR |

Primary Examiner—Rodney H. Bonck
Attorney, Agent, or Firm—Birch, Stewart, Kolasch & Birch

[57] ABSTRACT

A brake holding system for vehicles, comprising a vacuum and magnetic device including a brake holder, a moon gear having a plurality of teeth, a push rod connected to a master cylinder, a speed monitoring device having a needle being contacted to a switch member and a brake releasing switch operatively associated with the accelerator. The brake holding system can be placed into position when the speed of the vehicle is reduced to between 0 and 5 mph by application of the brake pedal. The brake is then automatically unlocked by depressing the accelerator pedal. Also, the driver can pull an emergency handle to mechanically release the brake.

12 Claims, 3 Drawing Figures

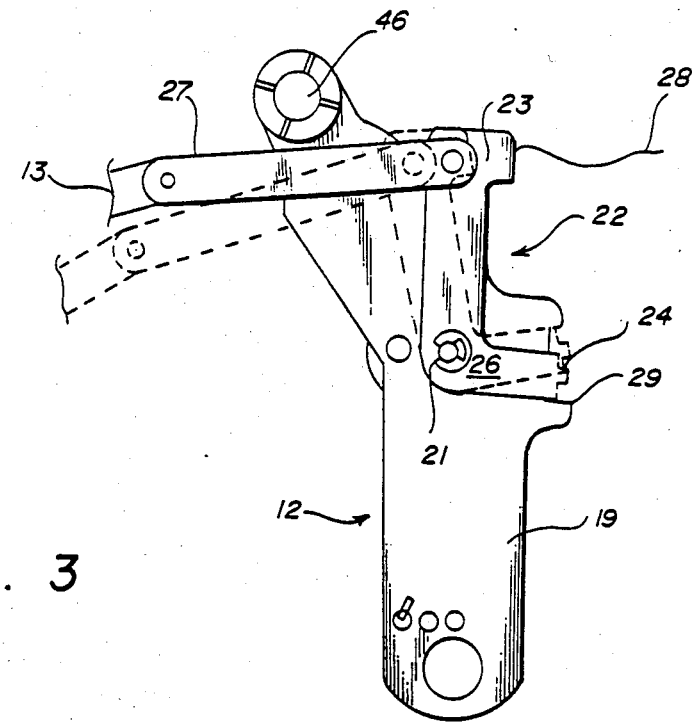
FIG. 3
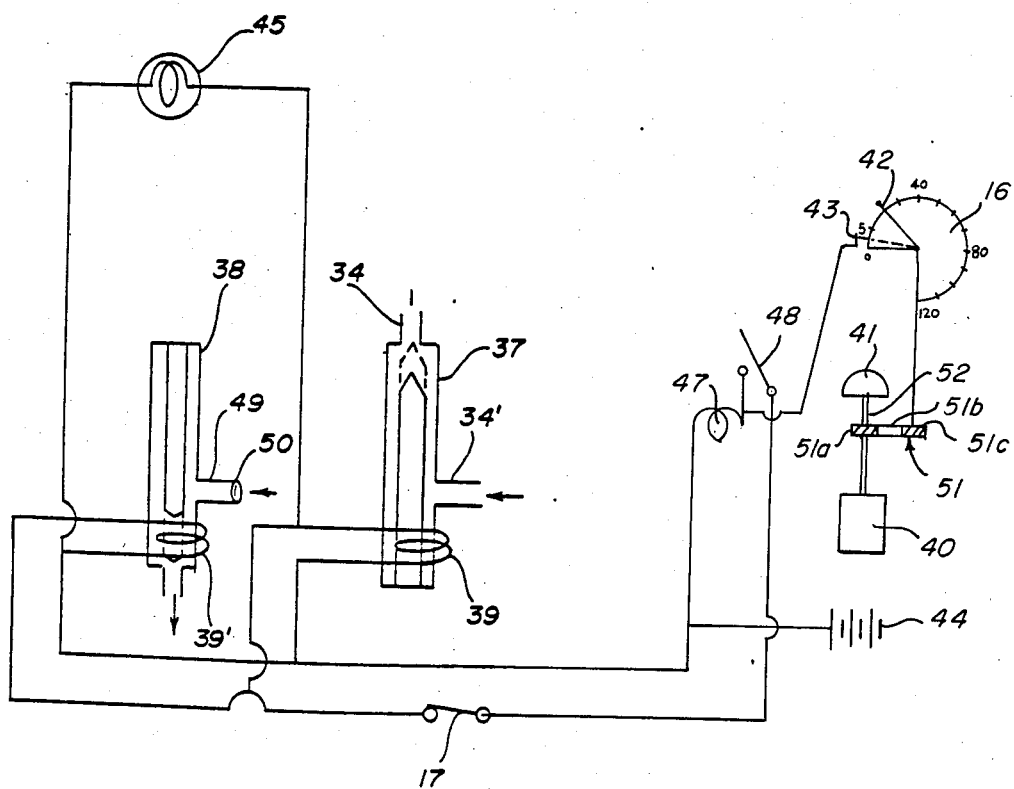

BRAKE HOLDING SYSTEM

BACKGROUND OF THE INVENTION

This application is a continuation-in-part of Application Ser. No. 763,715, filed Aug. 8, 1985, and now U.S. Pat. No. 4,646,903, for "Improved Brake Holding System".

The present invention relates to an improved brake holding system of an automotive vehicle. More particularly, the present invention is directed to a brake holding system for vehicles comprising a vacuum magnetic device operatively associated with a brake holder and a moon gear member attached to a push rod connected to the master cylinder, said moon gear member having teeth on one side thereof whereby when the speed of the automobile is reduced to between 0 and 5 mph and the foot brake is then applied, such as for example, at a stoplight, the brake is automatically engaged and maintained and thus the operator does not need to keep hig foot on the brake pedal. The brake can then be automatically released when the accelerator pedal is depressed by the driver for advancing the automobile. In a further feature of the present invention, the brake holding system can be operated by pulling an emergency handle when the release system does not operate.

In many of the brake holding and releasing systems known in the art, the mechanism are very complicated, rendering them unacceptable for commercial applicability or availability. Such brake controlling systems are shown in U.S. Pat. No. 2,642,484 to Price, U.S. Pat. No. 2,690,824 to Forman, U.S. Pat. No. 2,849,557 to Long, U.S. Pat. No. 2,938,611 to Cook, and U.S. Pat. No. 3,021,821 to Prather. The present Applicant is also prosecuting another U.S. patent application Ser. No. 681,254, filed Dec. 13, 1984, which disclosed a brake holding system for vehicles wherein, when the automobile is stopped by the application of a foot brake pedal by the actuation of a switch, the operator does not need to keep his foot on the brake pedal and, thus, the brake can be automatically released when the accelerator pedal is depressed by the driver. However, this brake holding system cannot be applied as conviently or reliably.

SUMMARY AND OBJECTS OF THE INVENTION

Accordingly, it is an object of the present invention to provide an improved brake holding system which is simple in construction and relatively inexpensive to manufacture.

Another object of the present invention is to provide a brake holding system which can safely lock a braking system on a vehicle when the speed of the automobile is reduced to between 0 and 5 mph.

A further object of the present invention is to provide a brake holding system which automatically unlocks the brake when the accelerator pedal is depressed.

Still another object of the present invention is to provide a brake holding system which is easy to operate and does not require the operator to keep the foot on the brake pedal at all times to prevent it from moving. Accordingly, it is particularly useful when the operator is a woman, a senior citizen or a young adult.

Yet another object of the present invention is to provide a brake holding system which is simple, inexpensive and can be readily installed on a used car.

A further object of the present invention is to provide a brake holding system comprising an emergency handle for releasing the brake in the event of failure of the automatic brake-releasing system of the present invention.

Yet another object of the present invention is to provide a brake holding system comprising a vacuum unit which is connected to the original vacuum system of the automobile.

A further object of the present invention is to provide a brake holding system which automatically locks the vehicle when the brakes are applied at a speed of between 0 to 5 mph.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention provides a brake holding system comprising a vacuum system and a magnetic unit including a brake holder and a moon gear member secured to a push rod which, in turn, is connected to the master cylinder. The brake holding system of the present invention can be actuated by the foot brake when the speed of the automobile is reduced to between 0 and 5 mph. The moon gear member has teeth on one side thereof for holding or releasing the brake system. Furthermore, an emergency handle can be added for providing an additional guarantee of safety.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a diagrammatic view showing the back of the holding device of FIGS. 1 and 2; and FIG. 4 shows the electrical circuit of the vacuum and magnetic systems of the brake holding system of the present invention.

DETAILED DESCRIPTION OF THE INVENTION

Figure 1:
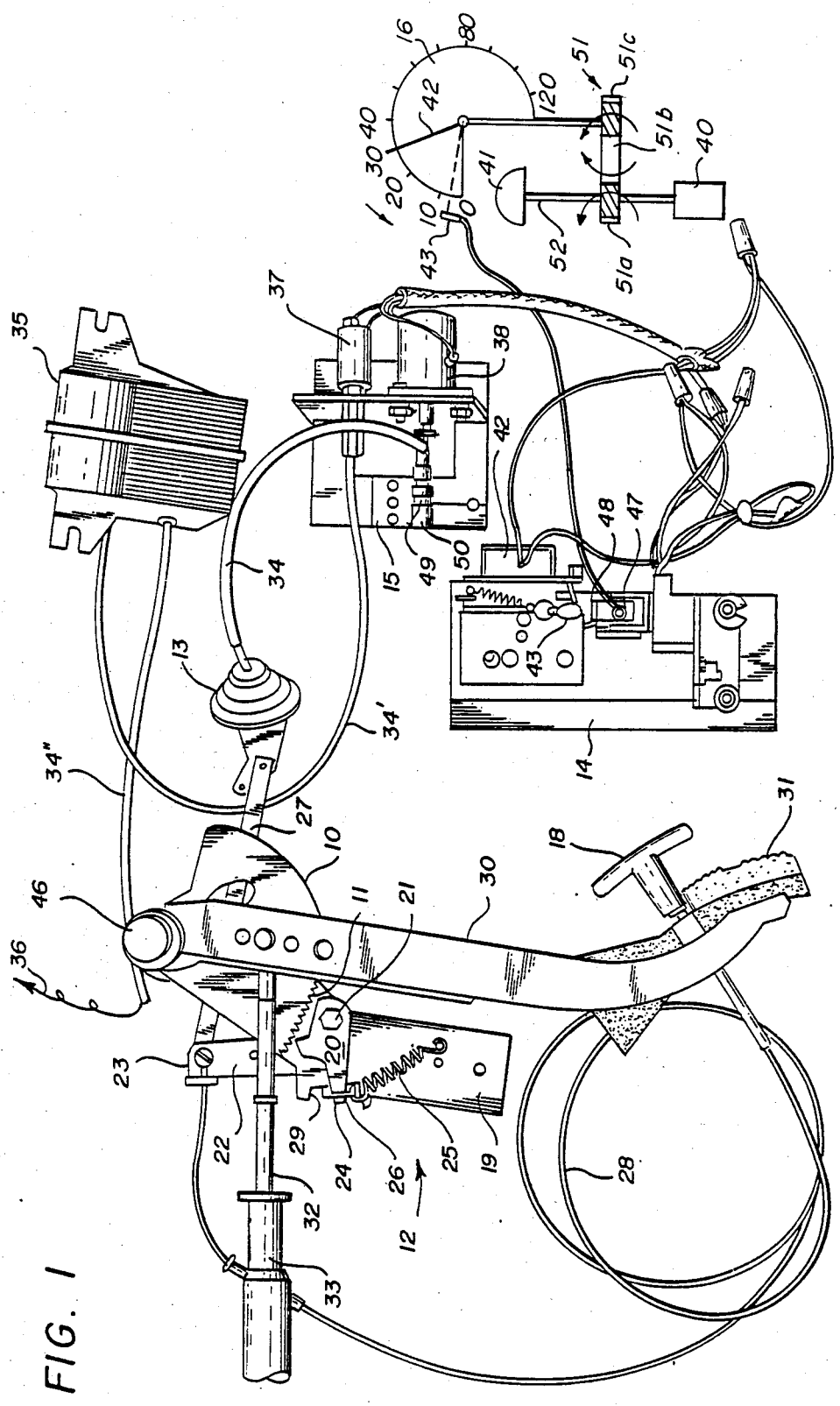
FIG. 1 is a perspective view showing components of the brake holding system of the present invention.
Figure 2:
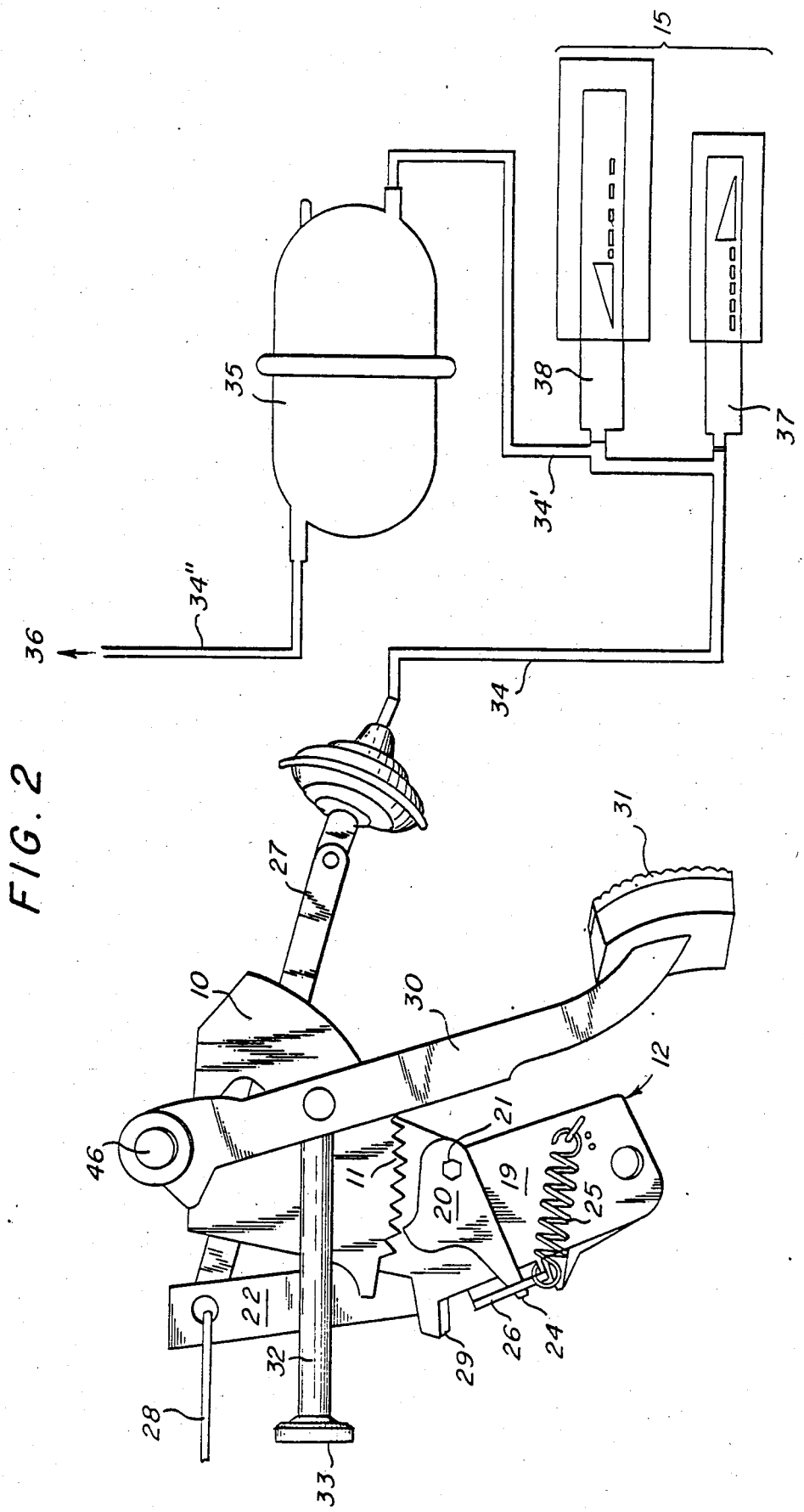
FIG. 2 is a diagrammatic view showing a part of the brake holding system of the present invention.

Referring now in detail to the drawings for the purpose of illustrating the present invention, the improved brake holding system of the present invention as shown in FIGS. 1 and 2 comprises a moon gear member 10 having a plurality of teeth 11 on one side thereof, a holding unit 12, a vacuum actuator 13, a magnetic device unit 14, an on/off member 15, a speed monitoring device 16 operatively associated with the speedometer, a releasing switch 17 (FIG. 4) and an emergency handle 18.

As shown in FIGS. 1 and 3, the holding unit 12 comprises a base 19, a holder 20 connected to the base 19 by a pivot pin 21, a "C" shaped connecting member 22, having one end portion 26 connected both to an end port 24 of the holder 20 and to a bias spring 25, and the other end portion 23 thereof being connected to a vacuum actuator connector 27 and to a wire 28 which communicates with the emergency handle 18. The base 19 forms a slot 29 for engaging the portion 26 of the "C" shaped connecting member 22.

The moon gear member 10 has a moon-shaped configuration at the side formed with the teeth 11 so that the edge of the holder 20 cannot disengage from the teeth in the backward direction undry any force after the holder 20 once engages the teeth 11 of the moon gear member 10. The moon gear member 10 is fixed to a shaft 46 which, in turn, is fixed to a brake pedal extension arm 30 of a brake pedal 31.

As shown in FIG. 1, the speed monitoring device is connected to the speedometer 41 and to the transmission 40 through a triple gear system. Thus the speedometer 41 is directly connected to the transmission 40 by a speedometer cable 52, the latter being provided with a speedometer gear 51a which rotates with the speedometer cable. The speedometer gear 51a transfers the rotation to intermediate gear 51b which in turn transfers the rotation to the speed monitoring gear 51c of the device 16 which records the speed.

A push rod 32 is connected to a master cylinder 33 and is also attached to the brake pedal extension arm 30.

The vacuum chamber 13 is connected to the on/off members 15 through a hose 34 and either to the vacuum system 36 through a hose 34' and a hose 34" directly or to the vacuum system 36 through a vacuum tank 35 by by the hose 34' and the hose 34", as shown in FIG. 2.

The on/off members 15 comprise an on-member 37 and an off-member 38, said members being alternately opened or closed by the magnetic force of magnetic coils 39 and 39' disposed at the lower end of the members 37 and 38, respectively, as shown in FIG. 4.

In operation, when the vehicle is to be stopped for a fixed period of time such as, for example, at a stoplight, and thus when the speed of the vehicle is reduced between 0 and 5 mph by the application of the brake pedal, the brake holder 20 engages the teeth 11 of the moon gear member 10 indirectly fixed to the push rod 32. When a needle 42 of the speed monitoring device 16 contacts the relay switch 43 and completes the circuit with the battery 44, and magnetic member 47 is reduced to function as a magnet. The magnetic member 47 contacts a touch switch 48. The on-member 37 provides communication through the hose 34' to the vacuum tank 35 or the vacuum system 36 through the hose 34". At this time, the off-member 38 is maintained in the closed position. When the drive does not depress the accelerator, the releasing switch 17 is on-position and the on-member 37 is opened to communicate between the hoses 34' and 34". On the other hand, the off-member 38 is closed to prevent from communicating an air entrance 49 containing a filtration member 50, because the magnetic coils 39 and 39' are magnetized respectively, and the vacuum actuator 13 pulls the connector 27. At that time, the brake pedal 31 is applied by the drive, and immediately the brake holder 20 engages the teeth 11 of the moon gear member 10 indirectly fixed to the push rod 32. At this time, there is no need to apply further pressure to the brake pedal 31 since the brake holder 20 is holding the moon gear member 10; that is, the push rod 32 is in a fixed state relative to the master cylinder 33.

On the other hand, when the accelerator (not shown in the drawings) is depressed, the releasing switch 17 (FIG. 4) is opened and demagnetizes the magnetic coils 39 and 39' of the on/off members 37 and 38 which causes the off-member 38 to communicate with the air through the air entrance 49 and the filtration member 50. Simultaneously, the on-member 37 closes to interrupt the vacuum which causes the brake holder 20 to retract to its original position due to the bias of the spring 25.

Because the magnetic coil 39 of the on-member 37 is not energized and the vacuum chamber 13 is not functioning and because the vacuum actuator 13 cannot now pull the connector 27, a lamp 45 disposed on the dashboard indicates the operation of both the holding and releasing condition. Also, when the releasing switch 17 is opened by pushing the accelerator, the magnetic coil 39 of the on-member 37 is rendered non-operative because the switch 16 is not maintained in a continuously closed state.

Also if the drive applies the brake pedal 31 when the speed of the automobile is above 5 mph, the holding system of the present invention does not actuate because the needle 42 separates from the switchmember 43, and the circuit with the battery 44 is interrupted.

If the releasing mechanism of the present invention gets out of order, the driver can pull the emergency handle 18 connected to the one portion 23 of the connecting member 22 through the wire (FIG. 1) so that the holder 20 can be mechanically released from the teeth 11 of the moon gear 10.

The invention being thus described, it will be obvious that the same may be varied in many ways. Such variatios are not to be regarded as a departure from the spirit and scope of the invention, and all such modifications as would be obvious to one skilled in the art are intended to be included in the scope of the following claims.

What is claimed is:

1. A brake holding system for a vehicle having, in combination, a brake pedal, a master cylinder, a vacuum system and a power supply, which comprises
   a moon gear having a plurality of teeth on one side thereof, said moon gear being operably connected to the master cylinder,
   a spring biased holding unit adapted to engage the teeth of the moon gear, against said spring bias whenever the holding system is activated,
   an on/off member,
   a vacuum actuator providing communication between said holding unit and said on/off member,
   a speed monitoring device operatively associated with a speedometer and communicating with said on/off member for automatically activating said holding unit upon the application of the brake pedal against said spring bias to engage said moon gear during the time when the speed of the vehicle is reduced to between 0 and 5 mph, and
   releasing switch communicating with said on/off member for disengaging said holding unit upon the depression of an accelerator pedal.

2. The brake holding system of claim 1, further including an emergency brake handle connected to the holding unit whereby, upon the actuation of the brake handle, the holding unit disengages from the teeth of the moon gear.

3. The brake holding system of claim 1, wherein the moon gear has a moon-shaped configuration on the side provided with teeth.

4. The brake holding system of claim 1, wherein the holding unit contains a "C" shaped connecting member, said holding unit forming a slot for engaging with one portion of the connecting member.

5. The brake holding system of claim 1, wherein the vacuum actuator communicates with the vacuum system via the on-off member.

6. The brake holding system of claim 1, wherein the on/off member has an air entrance containing a filtration member for the air.

7. The brake holding system of claim 1, wherein the on/off member has an outlet disposed at the lower portion thereof to communicate with the vacuum system.

8. The brake holding system of claim 1, wherein the speed monitoring device has a needle which contacts a switch member when the speed of the automobile is reduced to between 0 to 5 mph.

9. The brake holding system of claim 1, wherein the switch is connected to the on/off member.

10. The brake holding system of claim 1, wherein the speedometer is connected to the transmission by a speedometer cable, and gear means are provided for transferring the rotation of the connecting member to the speed monitoring device.

11. The brake holding system of claim 10, wherein the gear means comprises a speedometer gear operatively associated with the speedometer, a speed monitoring gear operatively associated with the speed monitoring device and an intermediate gear which is operatively engaged with both the speedometer gear and the speed monitoring gear.

12. The brake holding system of claim 1, wherein the releasing switch is in the off position when the accelerator is depressed.

* * * * *